US006037036A

United States Patent [19]

Febel

[11] Patent Number: 6,037,036

[45] Date of Patent: Mar. 14, 2000

[54] CUSHIONING CONVERSION MACHINE WITH STITCHING WHEELS HAVING HOOK PROJECTIONS

[75] Inventor: Gary K. Febel, Jefferson, Ohio

[73] Assignee: Ranpak Corp., Concord Township, Ohio

[21] Appl. No.: 09/073,702

[22] Filed: May 6, 1998

Related U.S. Application Data

[63] Continuation of application No. 08/476,358, Jun. 7, 1995, Pat. No. 5,807,229.

[51] Int. Cl.[7] .......... B32B 3/10

[52] U.S. Cl. .......... 428/132; 428/131; 428/137; 428/138; 428/133; 428/153; 428/154; 428/126; 428/127; 428/129; 206/521; 206/586; 206/814; 493/967; 493/464; 493/340

[58] Field of Search .......... 428/131, 137, 428/138, 132, 133, 153, 154, 126, 127, 129; 206/521, 586, 814; 493/967, 464, 340

[56] References Cited

U.S. PATENT DOCUMENTS

| | | | |
|---|---|---|---|
| 1,989,794 | 2/1935 | Duvall | 156/467 |
| 2,935,002 | 5/1960 | Robinson, Jr. | 93/1.1 |
| 3,323,983 | 6/1967 | Palmer et al. | 162/362 |
| 3,377,224 | 4/1968 | Gresham et al. | 156/209 |
| 3,509,797 | 5/1970 | Johnson | 493/967 |
| 3,518,147 | 6/1970 | Harmsen | 83/660 |
| 3,546,742 | 12/1970 | Kugler | 83/660 |
| 3,580,269 | 5/1971 | Ehrens | 83/660 |
| 3,603,216 | 9/1971 | Johnson | 493/967 |
| 3,613,522 | 10/1971 | Johnson | 493/967 |
| 3,682,028 | 8/1972 | Clayton | 83/660 |
| 3,898,920 | 8/1975 | Zucker | 93/1.1 |
| 3,956,956 | 5/1976 | Bertholf | 83/345 |
| 4,026,198 | 5/1977 | Ottaviano | 493/967 |
| 4,085,662 | 4/1978 | Ottaviano | 493/967 |
| 4,237,776 | 12/1980 | Ottaviano | 493/967 |
| 4,277,531 | 7/1981 | Picone | 428/228 |
| 4,717,613 | 1/1988 | Ottaviano | 493/357 |
| 4,750,896 | 6/1988 | Komaransky et al. | 493/357 |
| 4,839,210 | 6/1989 | Komaransky et al. | 428/77 |
| 4,884,999 | 12/1989 | Baldacci | 493/439 |
| 4,937,131 | 6/1990 | Baldacci | 428/131 |
| 4,968,291 | 11/1990 | Baldacci et al. | 493/967 |
| 5,117,720 | 6/1992 | Bussi | 83/660 |
| 5,123,889 | 6/1992 | Armington et al. | 493/967 |
| 5,129,297 | 7/1992 | Bussi | 83/30 |
| 5,246,656 | 9/1993 | Stephenson | 264/156 |
| 5,558,923 | 9/1996 | Vesamaa | 428/154 |

*Primary Examiner*—William P. Watkins, III
*Attorney, Agent, or Firm*—Renner, Otto, Boisselle & Sklar, P.L.L.

[57] ABSTRACT

A cushioning conversion machine, converting method and dunnage product characterized by a novel connecting assembly which provides a unique interlock between overlapped portions of sheet-like stock material forming a dunnage product to prevent "unzippering" of the product. The connecting assembly includes a pair of loosely meshed stitching wheels, a first one of the stitching wheels having a plurality of radial projections protruding from a radially outer circumferential surface thereof, and a second one of the stitching wheels including a plurality of recesses for receiving the radial projections in meshed relationship upon rotation of the stitching wheels. The radial projections each have a radially outer end portion forming a hook, whereby, upon rotation of the stitching wheels with the overlapped portions of the stock material passing therebetween, the radial projection will pierce through and form a perforation in the overlapped portions as it moves into the recess in the second stitching wheel and then hook and reversely pull back through the perforation at least partway a tab portion of the overlapped portions adjacent the perforation.

20 Claims, 9 Drawing Sheets

CUSHIONING CONVERSION MACHINE WITH STITCHING WHEELS HAVING HOOK PROJECTIONS

RELATED APPLICATIONS

This application is a continuation of Ser. No. 08/476,358, filed Jun. 7, 1995 issued Sep. 15, 1998, as U.S. Pat. No. 5,807,229.

FIELD OF THE INVENTION

The invention herein described relates generally to a cushioning conversion machine and, more particularly, to a novel form of stitching assembly for connecting a cushioning product formed from sheet-like stock material.

BACKGROUND OF THE INVENTION

In the process of shipping an item from one location to another, a protective packaging material is typically placed in the shipping case, or box, to fill any voids and/or to cushion the item during the shipping process. Some conventional protective packaging materials are plastic foam peanuts and plastic bubble pack. While these conventional plastic materials seem to perform adequately as cushioning products, they are not without disadvantages. Perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

The foregoing and other disadvantages of conventional plastic packaging materials have made paper protective packaging material a very popular alternative. Paper is biodegradable, recyclable and renewable, making it an environmentally responsible choice for conscientious industries.

While paper in sheet form could possibly be used as a protective packaging material, it is usually preferable to convert the sheets of paper into a pad-like or other relatively low density dunnage product. This conversion may be accomplished by a cushioning conversion machine, such as those disclosed in commonly assigned U.S. Pat. Nos. 4,968,291 and 5,123,889. The therein disclosed cushioning conversion machines convert sheet-like stock material, such as paper in multi-ply form, into a pad-like dunnage product having longitudinally extending pillow-like portions that are connected together along a stitched central portion of the product. The stock material preferably consists of three superimposed webs or layers of biodegradable, recyclable and reusable thirty-pound Kraft paper rolled onto a hollow cylindrical tube. A thirty-inch wide roll of this paper, which is approximately 450 feet long, will weigh about 35 pounds and will provide cushioning equal to approximately four fifteen cubic foot bags of plastic foam peanuts while at the same time requiring less than one-thirtieth the storage space.

The cushioning conversion machines disclosed in the above-identified patents use a connecting assembly comprising a pair of loosely meshed gear-like members between which overlapping portions of the stock material layers pass. The loosely meshed gear-like members cooperate to stitch, as by coining, the overlapping portions thereby to connect the strip along the central portion of the product disposed between lateral pillow-like portions that primarily contribute to the cushioning properties of the product.

A secure stitching is desired to maintain the intactness of the pillow-like portions and thus the cushioning properties of the dunnage product. To this end, perforations heretofore have been provided in the connecting portion of the produced dunnage strip to aid the coined portions in preventing opening up or separation of the connected portions of the product, this commonly being referred to as "unzippering". The perforations were produced by projections extending radially outwardly from the teeth of at least one of the gear-like members. For further details, reference may be had to U.S. Pat. Nos. 4,937,131 and 4,968,291.

Although the connecting assemblies disclosed in the above-identified patents adequately perform their connecting and other functions, it would be desirable to have a stitching assembly that further facilitates and/or enhances the stitching of overlapped portions of sheet-like stock material forming a low density cushioning product, particularly when using heavier weight and/or stiffer stock material.

SUMMARY OF THE INVENTION

The present invention provides a novel stitching assembly for a cushioning conversion machine, a cushioning conversion machine including the novel connecting assembly, a method of forming a novel cushioning product that results from using the novel connecting assembly, and a new dunnage product. A preferred embodiment of the stitching assembly provides a unique interlock between overlapped portions of the sheet-like stock material to prevent "unzippering" of the low density cushioning product produced by the cushioning conversion machine.

According to one aspect of the invention, a cushioning conversion machine for converting sheet-like stock material into a dunnage product, comprises a stock-shaping assembly which shapes the stock material into a continuous three-dimensional strip of dunnage having overlapped portions of the stock material, and a connecting assembly which connects the overlapped portions of the stock material to maintain the three-dimensional shape of the strip of dunnage. The connecting assembly includes a pair of loosely meshed stitching wheels, a first one of the stitching wheels having at least one radial projection protruding from a radially outer circumferential surface thereof, and the other or second one of the stitching wheels including at least one recess for receiving the radial projection in meshed relationship upon rotation of the stitching wheels. The radial projection has a radially outer end portion forming a hook, whereby, upon rotation of the stitching wheels with the overlapped portions of the stock material passing therebetween, the radial projection will pierce through and form a perforation in the overlapped portions as it moves into the recess in the second stitching wheel and then hook and reversely pull back through the perforation at least partway a tab portion of the overlapped portions adjacent the perforation.

According to a preferred embodiment of the invention, there are a plurality of circumferentially spaced apart radial projections and recesses. The radially outer end portion of each radial projection and each recess are correspondingly tapered and, more preferably, conical in shape, with the radially outer end portion tapering to a point for easy piercing of the overlapped layers of stock material. The hook may be formed by a notch in a side of the radial projection and preferably each radial projection is replaceably attached to the first stitching wheel, as by having a threaded end portion screwed into a threaded hole in the first stitching wheel from which the radial projection projects. An intermediate portion of the radial projection may have at least one wrench surface for engagement by a wrench to facilitate turning of the one radial projection. Each radial projection may further have a cylindrical portion between the threaded inner end portion and the intermediate portion, and the threaded hole may have an unthreaded cylindrical counterbore portion for receiving the cylindrical portion with a close fit.

Further in accordance with the invention, the radially outer circumferential surface of the first stitching wheel may have a flat portion from which each radial projection projects. Additionally or alternatively, the radial projections may be axially as well as circumferentially spaced apart, as in axially spaced apart rows extending circumferentially around the stitching wheel. The second stitching wheel is provided with a corresponding pattern of recesses for meshing with the radial projections of the first wheel during rotation of the stitching wheels.

Still further in accordance with a preferred embodiment, each radial projection protrudes from an annular land portion of the first stitching wheel, and the recess is disposed at the bottom of an annular groove in a radially outer surface of the second stitching wheel. The annular groove is bounded at opposite axial ends thereof by lands axially spaced apart a distance about equal the axial width of the annular land portion of the first stitching wheel. Preferably, the annular groove is formed by a central disc axially sandwiched between a pair of side discs, the side discs each having a diameter greater than the diameter of the central disc. The side discs have at the radially outer edges thereof friction enhancing means, such as teeth, for frictionally engaging the overlapped portions of the stock material to facilitate feeding of the overlapped portions between the stitching wheels during rotation thereof.

According to another broad aspect of the invention, a cushioning conversion machine for converting sheet-like stock material into a dunnage product comprises a stock-shaping assembly which shapes the stock material into a continuous three-dimensional strip of dunnage having overlapped portions of the stock material, and a connecting assembly which connects the overlapped portions of the stock material to maintain the three-dimensional shape of the strip of dunnage, the connecting assembly including a pair of rotatable stitching wheels, a first one of the stitching wheels having at least one radial projection protruding from a radially outer circumferential surface thereof, the other or second one of the stitching wheels including at least one recess for receiving the radial projection in meshed relationship upon rotation of the stitching wheels, and the radial projection tapering to a point at its radially outer end.

According to still another broad aspect of the invention, a cushioning conversion machine for converting sheet-like stock material into a dunnage product comprises a stock-shaping assembly which shapes the stock material into a continuous three-dimensional strip of dunnage having overlapped portions of the stock material, and a connecting assembly which connects the overlapped portions of the stock material to maintain the three-dimensional shape of the strip of dunnage, the connecting assembly including a pair of rotatable stitching wheels, a first one of the stitching wheels having at least one radial projection protruding from a radially outer circumferential surface thereof, the other or second one of the stitching wheels including at least one recess for receiving the radial projection in meshed relationship upon rotation of the stitching wheels, and the radial projection being replaceably attached to the first stitching wheel.

According to yet another broad aspect of the invention, a cushioning conversion machine for converting sheet-like stock material into a dunnage product comprising a stock-shaping assembly which shapes the stock material into a continuous three-dimensional strip of dunnage having overlapped portions of the stock material, and a connecting assembly which connects the overlapped portions of the stock material to maintain the three-dimensional shape of the strip of dunnage, the connecting assembly including a pair of rotatable stitching wheels, a first one of the stitching wheels having at least one radial projection protruding from an annular land portion thereof, the other or second one of the stitching wheels including at least one recess for receiving the radial projection in meshed relationship upon rotation of the stitching wheels, the recess being disposed at the bottom of an annular groove in a radially outer surface of the second stitching wheel, and the annular groove being bounded at opposite axial ends thereof by lands axially spaced apart a distance about equal the axial width of the annular land portion of the first stitching wheel.

According to still yet another broad aspect of the invention, a cushioning conversion machine for converting sheet-like stock material into a dunnage product comprising a stock-shaping assembly which shapes the stock material into a continuous three-dimensional strip of dunnage having overlapped portions of the stock material, and a connecting assembly which connects the overlapped portions of the stock material to maintain the three-dimensional shape of the strip of dunnage, the connecting assembly including a pair of rotatable stitching wheels, each of the stitching wheels being formed by a central disc sandwiched between a pair of side discs, the central disc of a first one of the stitching wheels having at least one radial projection protruding from a radially outer annular portion thereof, the central disc of the other or second one of the stitching wheels including at least one recess for receiving the radial projection in meshed relationship upon rotation of the stitching wheels, and the side discs having at the radially outer edges thereof friction enhancing means for frictionally engaging the overlapped portions of the stock material to facilitate feeding of the overlapped portions between the stitching wheels during rotation thereof.

In a preferred embodiment, the friction enhancing means includes a plurality of alternating ridges and valleys, with such preferably being formed by a plurality of teeth. The side discs of the first stitching wheel have a diameter greater than the diameter of the respective central disc and the side discs of the second stitching wheel have a diameter less than the diameter of the respective central disc, whereby stock material passing between the stitching wheels is caused to be folded over shoulders formed at the intersection of the side discs with the central disc of the second one of the stitching wheel. The second stitching wheel further includes a pair of outer discs between which the central and side discs are sandwiched, the outer discs each defining with the central disc a respective annular groove having an axial width about equal the axial width of the corresponding side disc of the first stitching wheel.

As is evident from the foregoing, the invention further provides a stitching wheel element for a connecting assembly in a cushioning conversion machine wherein sheet-like material is converted into a dunnage product, the stitching wheel element comprising a stitching wheel having a plurality of radial projections protruding from a radially outer circumferential surface thereof, and at least some of the radial projections having a radially outer end portion forming a hook. Also provided is another stitching wheel element comprising a stitching wheel having a plurality of recesses in a radially outer circumferential surface thereof, the recesses opening to the radially outer circumferential surface at an opening spaced axially inwardly of axially outer edges of the radially outer circumferential surface.

According to another aspect of the invention, there is provided a method for converting sheet-like stock material into a dunnage product, comprising the steps of shaping the stock material into a continuous three-dimensional strip of dunnage having overlapped portions of the stock material, and connecting the overlapped portions of the stock material to maintain the three-dimensional shape of the strip of dunnage, the connecting step including forming a perforation in the overlapped portions by piercing the overlapped portions with a perforating element and then using the perforating element to pull back through the perforation at least part way an edge of the perforation, thereby to form a mechanical interference interlock between the overlapped portions.

According to a further aspect of the invention, there is provided a dunnage product formed from one or more layers of sheet-like stock material having overlapped portions connected together by perforations having opposite edges deformed into the perforations in opposite directions. In a preferred embodiment, lateral edges of the layers of stock material are generally loosely rolled inwardly and form crumpled pillow-like portions separated by a relatively compressed and narrower central band portion, and the perforations are disposed along the central band portion between two rows of dents in the central band portion.

The present invention provides the foregoing and other features hereinafter fully described and particularly pointed out in the claims, the following description and annexed drawings setting forth in detail certain illustrative embodiments of the invention, these embodiments being indicative, however, of but a few of the various ways in which the principles of the invention may be employed.

DETAILED DESCRIPTION

Figure 12:
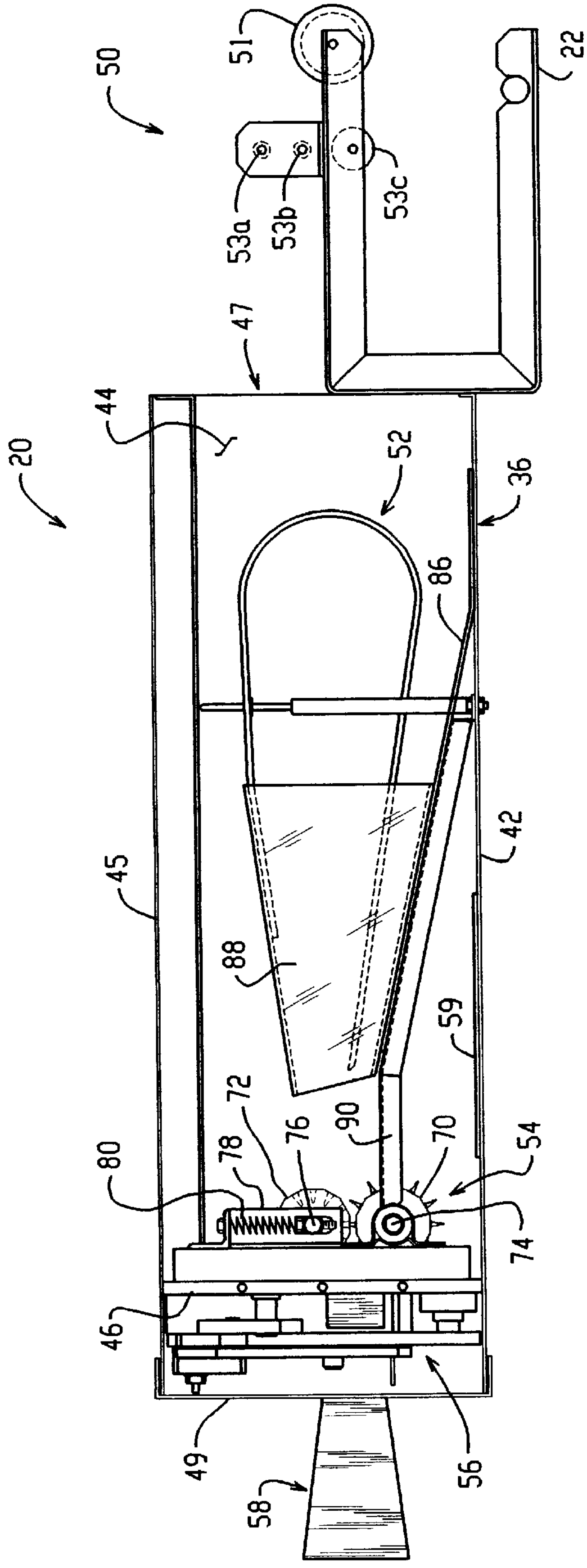
FIG. 12 is a side view of a cushioning conversion machine employing any one of the above stitching wheel embodiments, with the side wall of the machine housing nearest the viewer broken away to permit viewing of internal machine components.

Referring now to the drawings in detail, and initially to FIG. 12, a cushioning conversion machine 20 according to the present invention is illustrated. The machine 20 has at its rear end (to the right in FIG. 12), a holder 22 for a supply, such as a roll or rolls, of sheet-like stock material. The stock material preferably consists of three superimposed plies or layers of biodegradable, recyclable and reusable thirty-pound Kraft paper rolled onto a hollow cylindrical tube. The illustrated exemplary machine 20 converts the stock material into a continuous unconnected strip having lateral pillow-like portions separated by a thin central band. This strip is connected along its central band to form a coined strip of cushioning product that may be cut into sections, or pads, of a desired length.

The machine includes a housing 36 having a base plate or wall 42, side plates or walls 44, and an end plate or wall 46 which collectively form a frame structure. The base wall 42 is generally planar and rectangular in shape. The housing also includes a top cover 45, which together with the base, side and end walls, form an enclosure.

The base and side walls 42 and 44 have at the upstream end of the housing inturned edge portions forming a rectangular border around a centrally located, and relatively large, rectangular stock inlet opening 47. This border may be viewed as an end plate or wall extending perpendicularly from the upstream edge of the base wall 42. It should be noted that the terms "upstream" and "downstream" are herein used in relation to the direction of flow of the stock material through the machine 20. The end plate 46 extends perpendicularly from a location near, but inward from, the downstream end of the base wall 42. The end plate 46 is generally rectangular and planar and includes a dunnage outlet opening.

The housing (or frame) 36 also includes a front cover or plate 49 which extends perpendicularly from the downstream edge of the base wall 42. Thus, the end plate 46 and front plate 49 bound upstream and downstream ends of a box-like extended portion of the downstream end of the housing 36. The front plate 49 may be a door-like structure which may be selectively opened to access cutting assembly components of the cushioning conversion machine 20.

The machine 20 further includes a stock supply assembly 50, a forming 20 assembly 52, a feed/connecting assembly 54 powered by a gear drive motor (not shown), a cutting/aligning assembly 56 powered by a cutter motor (not shown), and a post-cutting constraining assembly 58. The stock supply assembly 50, including a constant entry roller 51 and separators 53*a*–53*c*, is mounted to an upstream side of the housing 36 or more particularly the upstream end plate or wall. The forming assembly 52 is located downstream of the stock supply assembly 50 interiorly of the housing and functions to form the stock material into a continuous three-dimensional strip of dunnage having portions of the stock material overlapped along the central region of the strip. The feed/connecting assembly 54 is located downstream of the forming assembly 52 and is mounted on an upstream side of the downstream end plate 46. On the opposite or downstream side of the downstream end plate 46, the cutting/aligning assembly 56 is mounted. The motors are mounted on the base wall 42 which may be provided with a transverse mounting plate 59 which forms part of the base wall or plate 42. The motors are disposed on opposite sides of the forming assembly 52. The post-cutting constraining assembly 58 is located downstream of the cutting/aligning assembly 56 and it is mounted on the front plate 49.

The feed/connecting assembly 54 in the illustrated machine performs two functions. The feed/connecting assembly connects the overlapped portions of the stock material to maintain the three-dimensional shape of the strip of dunnage. The feed/connecting assembly also functions to feed stock material through the machine, as by pulling the stock material from the stock supply assembly and through the forming assembly 52. These dual functions are carried out by a pair of rotating gear-like members 70 and 72 described in greater detail below. In the illustrated embodiment by which the present invention is exemplified, one of the gear-like members 70 is mounted on a shaft 74 rotatably driven by the feed motor whereas the other is an idler carried on a floating shaft 76. The driven gear-like member 70 rotates about an axis fixed with respect to the front plate 46 whereas the other is carried on the floating shaft which is guided by guide slots in guides 78 for parallel translating movement toward and away from the driven roller. As is preferred, the floating shaft, and thus the floating gear-like member, is resiliently biased by a spring 80 or other suitable resilient biasing means towards the driven gear-like member. The spring force may be adjusted to vary the squeeze force applied by the gear-like members to the strip of stock material passing therebetween from the forming assembly to the cutting assembly.

In operation of the machine 20, the stock supply assembly 50 supplies stock material to the forming assembly 52. The forming assembly 52 causes inward rolling and shaping of the sheet-like stock material to form lateral pillow-like portions of a continuous strip of cushioning. The feed/connecting assembly 54 advances the stock material through the machine and also connects the central band to form a connected dunnage strip. As the connected dunnage strip travels downstream from the feed/connecting assembly 54, the cutting/aligning assembly 56 cuts the dunnage strip into sections, or pads, of a desired length. The cut pads then travel through the post-cutting constraining assembly 58.

The machine 20 as thus far described is generally the same as the machine described in greater detail in U.S. Pat. No. 5,123,889 (hereby incorporated herein by reference) and reference may be had thereto for further details of the general arrangement and operation of the machine. However, it is noted that the illustrated forming assembly 52 is of the type described in pending U.S. patent application Ser. No. 08/386,355, abandoned, which is hereby incorporated by reference. Also, the forming assembly is provided with a guide ramp 86 to which a shaping chute 88 is mounted, the guide ramp having an extended guide surface portion 90 extending from the downstream end of the shaping chute into close proximity to the gear-like members 70 and 72.

The present invention provides certain improvements in such machine for particular applications, the hereinafter improvements being desirable, for example, when converting heavier weight and/or stiffer stock material, such as three plies of 50 pound Kraft paper. More particularly, the present invention provides novel gear-like members for replacing the presently known gear-like members, the new gear-like members enabling heavy duty stitching of heavier weight and/or stiffer stock material. It is noted that the new gear-like members may be used to perform both the stitching and feed functions previously performed by presently known gear-like members, or just the stitching function while other means are provided to perform the feed function, such as one or more feed assemblies for pushing and/or pulling the stock material through the machine and/or sub-components thereof.

Accordingly, the feed/connecting assembly according to the present invention includes the pair of rotatable gear-like members 70 and 72 hereinafter referred to as stitching wheels, although it is noted that the stitching wheels may also be used to perform the stock material feed function, as is preferred in the case of the machine illustrated in FIG. 12.

Figure 1:
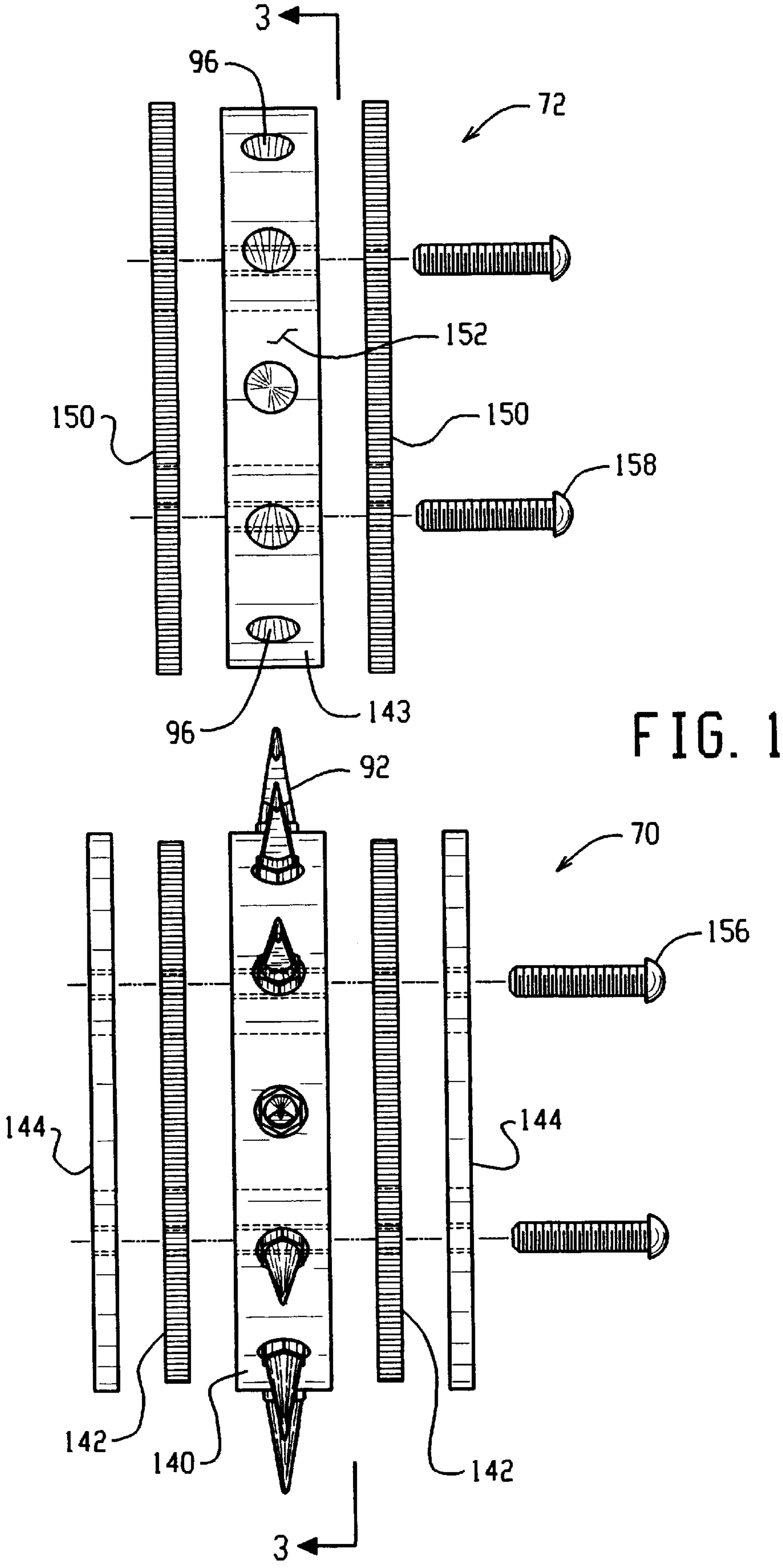
FIG. 1 is an exploded elevational view of a pair of cooperating stitching wheels according to the invention.
Figure 2:
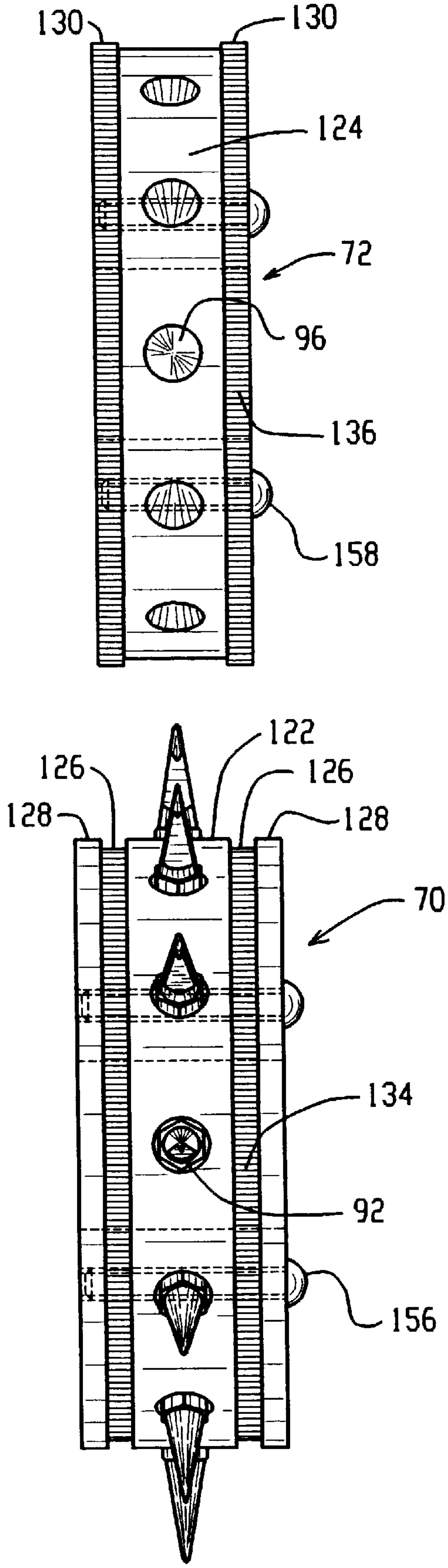
FIG. 2 is a view similar to FIG. 1, but with the component parts of the stitching wheels shown assembled together.
Figure 3:
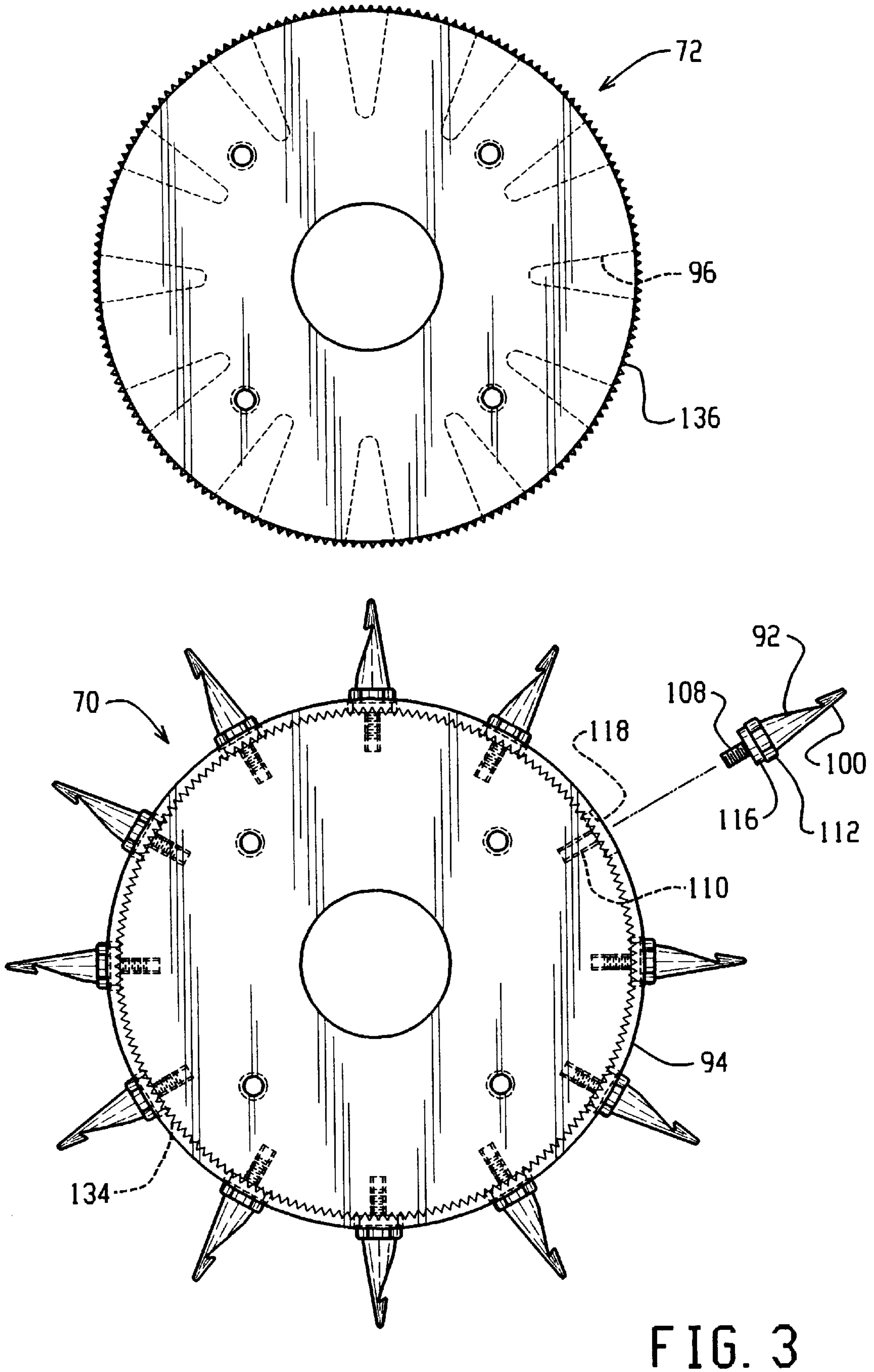
FIG. 3 is a side (axial end) view of the stitching wheels of FIG. 2, with a radial projection of one of the stitching wheels shown exploded away.

With reference to FIGS. 1–3, the stitching wheel 70 (hereinafter referred to as the male stitching wheel) has at least one and preferably a plurality of radial projections 92 protruding from a radially outer circumferential surface 94 of the male stitching wheel. The other (or female) stitching wheel 72 includes at least one and preferably a plurality of recesses 96 for receiving the radial projections 92 of the male stitching wheel in loosely meshed relationship upon rotation of the stitching wheels. The radial projections and recesses preferably are circumferentially equally spaced apart, and the recesses preferably are oversized in relation to the portion of the radial projections received therein. Although all of the radial projections may be on one wheel and the recesses in the other, it will be appreciated that each wheel may be provided with radial projections and recesses for meshing with the radial projections on the other wheel. For example, each wheel may have alternating projections and recesses at equal spacings.

As best shown in FIGS. 4A–4D, each radial projection 92 preferably has the radially outer end portion 100 thereof forming a hook 102. Also, the outer end portion of each radial projection and the corresponding recess (FIG. 3) are preferably correspondingly tapered. A preferred form of radial projection has a radially outer end portion that is conical in shape and which tapers to a point as shown. Accordingly, the mating recesses preferably are conical in shape (FIG. 3). The hook 102 may be formed by a notch 104 in a side of the radially outer end portion as shown. The mouth of the hook opens to the leading side of the radial projection in relation to its direction of rotation. In FIG. 3, the stitching wheel rotates counter-clockwise whereas the stitching wheel rotates in the opposite direction.

Although the radial projections 92 may be formed integrally with the male stitching wheel 70, each radial projection preferably is replaceably (removably) attached to the male stitching wheel not only to facilitate fabrication but also to enable easy replacement of worn or broken radial projections without having to replace the entire male stitching wheel. To this end, each radial projection has a threaded radially inner end portion 108 (FIGS. 4B–4D), and the male stitching wheel has a threaded hole 110 for screwed-in receipt of the inner end portion of the projection. A preferred form of radial projection shown in FIGS. 4A–4D further has an intermediate portion 112 with at least one flat or other wrench surface 114 for engagement by a wrench to facilitate turning of the one radial projection. The intermediate portion preferably has one or more pairs of opposed flat surfaces 114 with a hexagonal cross-section (see FIG. 4D) being preferred. Also, the radial projection has a cylindrical portion 116 between the threaded inner end portion 108 and the intermediate portion 112. In relation thereto, the threaded hole 110 in the stitching wheel has an unthreaded cylindrical counterbore portion 118 (FIG. 3) for receiving the cylindrical portion with a close fit. Preferably, the bottom of the cylindrical portion is tightened against the bottom of the counterbore portion for stable and strong securement of the radial projection to the stitching wheel.

As best shown in FIG. 2, the radial projections 92 preferably protrude from a central annular land 122 at the outer diameter of the male stitching wheel 70 while the mating recesses 96 are disposed at the bottom of an annular groove 124 in a radially outer surface of the female stitching wheel 72. The central annular land 122 is axially bounded by annular grooves 126 which have the axially outer walls thereof formed by outer annular lands 128. The annular groove 124 in the female stitching wheel 72, which is aligned with the central annular land 122, is bounded at opposite axial ends thereof by annular lands 130 axially spaced apart a distance about equal the axial width of the central annular land 122. The annular lands 130 are about equal in axial width to the annular grooves 126 with which they are respectively aligned, and both the outer diameter of the annular lands 130 and the bottom of the annular grooves 126 are provided with a plurality of alternating ridges and valleys, such as may be formed by teeth, serrations, knurling, etc., or with other friction enhancing means, such as a rubber or other surface material having a high coefficient of friction in relation to the stock material being used. Preferably these surfaces are respectively provided with a plurality of saw teeth 134 and 136 for engaging and denting the stock material therebetween. The aligned lands and grooves on opposite sides of the central land cooperate to axially stretch the stock material transversely across the central land for enhancing the piercing and subsequent stitching function performed by the radial projections as hereinafter described. The aligned lands and grooves also facilitate straight feed-through of the stock material between the stitching wheels.

As is preferred and shown in FIGS. 1 and 2, the male stitching wheel 70 preferably is formed by a composite sandwich of axially stacked discs including a central disc 140, a pair of side discs 142, and a pair of outer discs 144. The radial projections 92 protrude from the central disc 140 while the side discs 142 have at the radially outer edges thereof friction enhancing means such as the aforesaid teeth 134. The outer diameter of each side disc is less than the outer diameters of the relatively adjacent central disc and outer disc, the radially outwardly projecting portions of the latter thus forming the outer and central lands 128 and 122 that axially bound the annular recesses 126.

Likewise, the female stitching wheel 72 preferably is formed by a composite sandwich of axially stacked discs including a central disc 148 and a pair of side discs 150. The recesses 96 preferably open to the radially outer circumferential surface 152 of the central disc at openings spaced axially inwardly of axially outer edges of central disc. The side discs 150 have at the radially outer edges thereof friction enhancing means such as the aforesaid teeth 136 in opposition to the teeth 134 on the side discs 142 of the male stitching wheel 70. The outer diameter of each side disc 150 is greater than the outer diameter of the central disc 148, the radially outwardly projecting portions of the former thus forming the outer lands 130 that axially bound the annular recess 124.

Figure 4A:
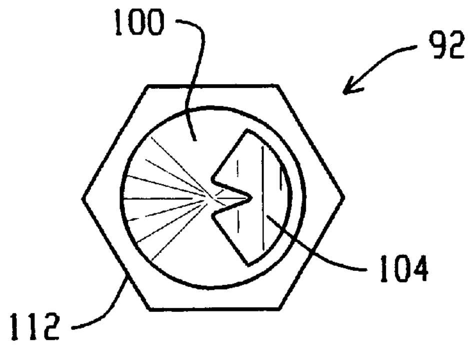
FIG. 4A is a top end view of a representative radial projection.
Figure 4C:
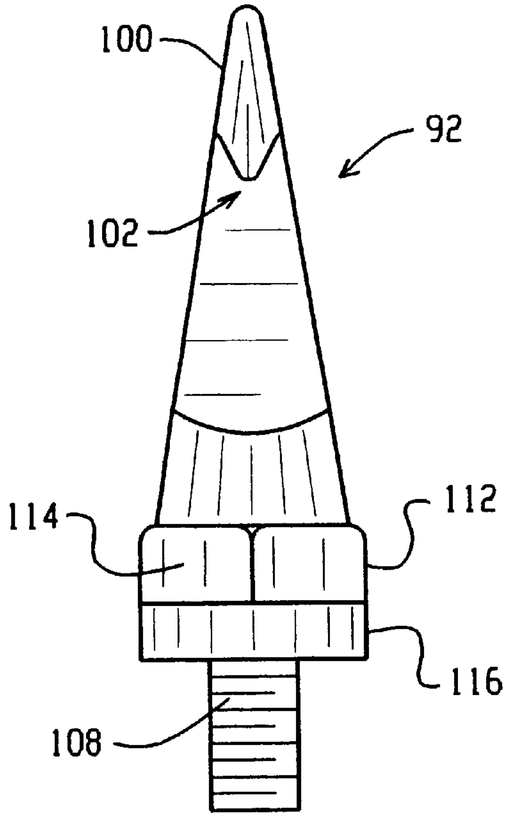
FIG. 4C is another side view of the radial projection, rotated 90° from the view angle of FIG. 4B.
Figure 4B:
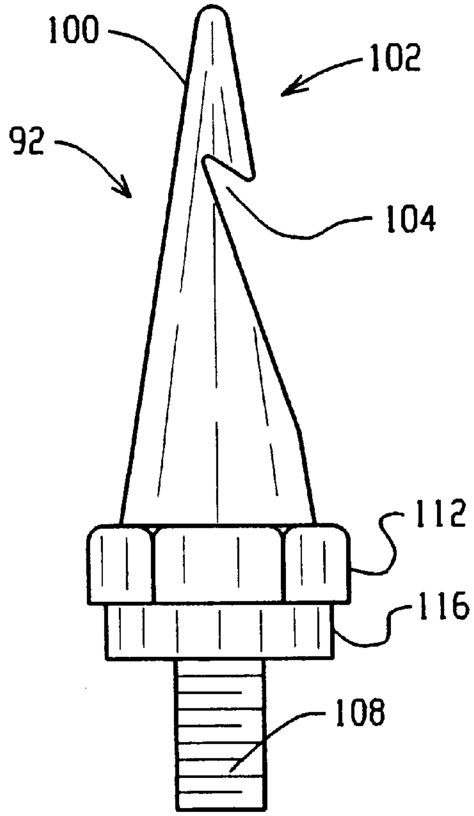
FIG. 4B is a side view of the radial projection of FIG. 4A.
Figure 4D:
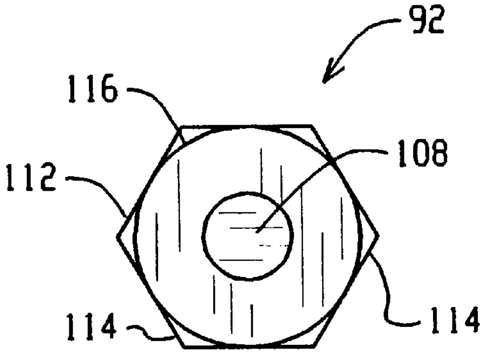
FIG. 4D is a bottom end view of the radial projection.

By way of specific example, the central discs 140 and 148 of the stitching wheels 70 and 72 may both have an outer diameter of about 3 inches and an axial width of about ½ inch. The side discs 142 and 150 of the stitching wheels may both have an axial width of about ⅛ inch, as may the outer discs 144 of the male stitching wheel 70. The side discs 142 and outer discs 144 of the male stitching wheel 70 respectively may have outer diameters of about 2 15/16 inches and about 3 inches, whereas the side discs 150 of the female stitching wheel 72 may have an outer diameter of about 3 inches. Preferably the discs are made of a suitable metal, and the discs may be assembled together by any suitable means such as the illustrated screw fasteners 156 and 158 or otherwise, such as by press fitting at the center bores thereof on a shaft or hub. The radial projections 92 may project from the outer diameter surface of the stitching wheel by about ½ inch and may have a width of about ¼ inch at the bottom of the portion that projects beyond the outer diameter surface of the stitching wheel. Also, the hook 102 may be formed by a V-shape notch 104 with the vertex of the V residing radially outwardly of the end of the shorter leg of the V that intersects a side surface of the radial projection, whereby the center axis of the mouth of the hook has both a radially inward component as well as circumferential component, as best shown in FIG. 4B.

Referring back to FIG. 12, the minimum spacing between the stitching wheels may be set in any suitable manner. Preferably, the outer diameter surfaces of the wheels are maintained touching each other when no stock material is disposed therebetween. In the illustrated embodiment, the inner ends of the guide slots in the guide blocks 80 limit movement of the floating shaft 76 towards the driven male stitching wheel 70 (or its driven shaft 74) and thus sets the minimum tension between the stitching wheels.

Figure 5:
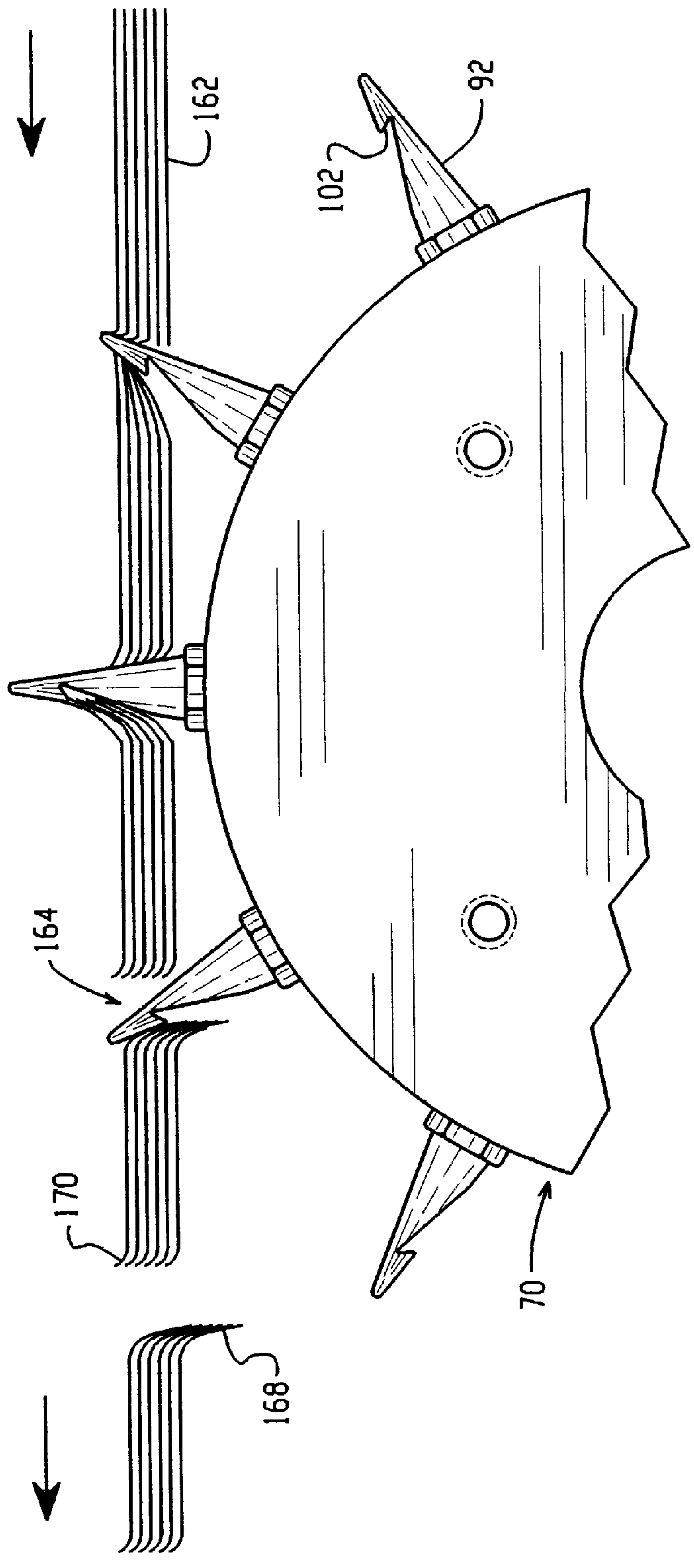
FIG. 5 is a fragmentary side view schematically illustrating the functional effect of the radial projections as they pierce into and then withdraw from overlapped portions of stock material.

During operation of the conversion machine 20 generally in the manner described in the aforesaid patents, and as schematically illustrated in FIG. 5, the overlapped portions of the stock material 162 will pass between the stitching wheels, at least one of which is rotatably driven as above indicated. The radial projections 92 on the male stitching wheel 70 will rotate into and pierce through and form a perforation 164 in the overlapped portions of the stock material as the radial projections move into mating recesses (not shown in FIG. 5). As this occurs, the edges of the perforation will be pushed into the perforations by the radial projection, i.e., radially outwardly in relation to the male stitching wheel 70. After the radial projection passes through the nip between the stitching wheels, the leading edge of the perforation, forming a tab portion 168, will be engaged by the hook 102 and then reversely pulled back through the perforation at least partway. That is, portions of the outermost layers of the stock material that are initially pushed outwardly by the radial projection during piercing and forming of the perforation will be pulled back through the perforations formed in relatively inwardly adjacent layers. However, the opposite or trailing edge or bent tab portion 170 of the perforation may remain deformed into the perforation in a direction opposite the direction that leading edge 168 is pulled through the perforation by the hook of the radial projection. The foregoing provides for a positive mechanical interference interlock between the overlapped portions of the stock material 162. It also is noted that the stock material passing between the stitching wheels is caused to be folded over shoulders formed at the intersection of the side discs with the central disc of the stitching wheel, whereby such stock material is axially stretched to facilitate penetration of the radial projection into the stock material.

Figure 6:
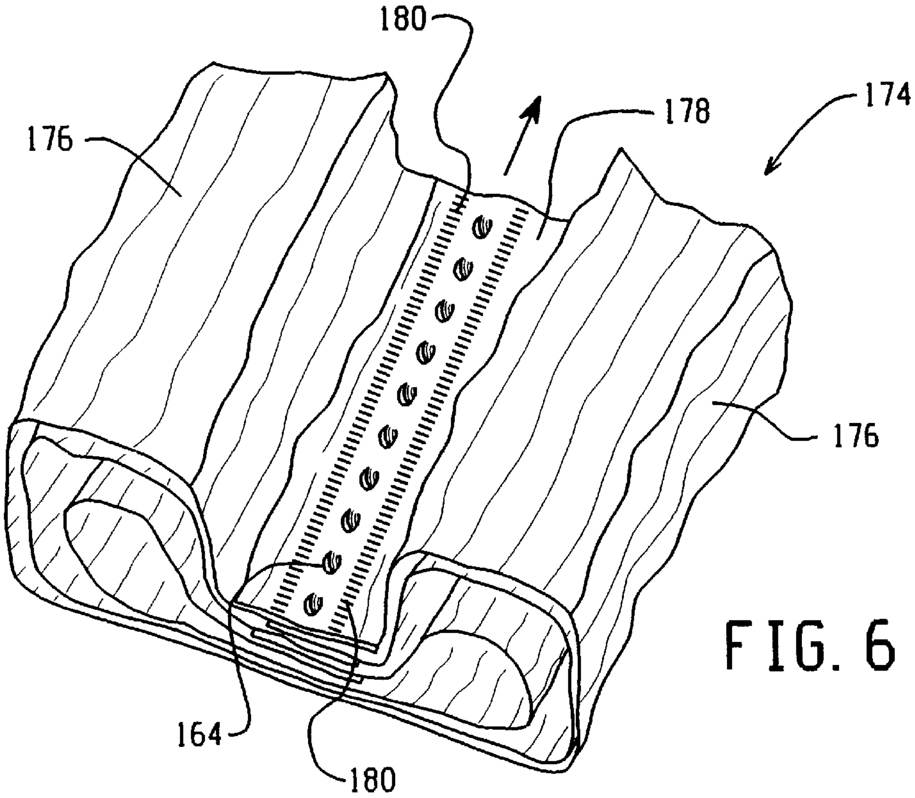
FIG. 6 is a fragmentary perspective view of a cushioning product made in accordance with the invention using the stitching wheels of FIGS. 1–5.

The result is a dunnage product like that illustrated at 174 in FIG. 6. The dunnage product 174 is formed from one or more layers of sheet-like stock material having lateral edges thereon generally loosely rolled inwardly and forming crumpled pillow-like portions 176 separated by a relatively compressed and narrower central band portion 178. The overlapped portions of stock material forming the central band portion are connected together by the perforations 164 having opposite edges deformed into the perforations in opposite directions. The herein references to edges of the perforations mean the respective tab-like border portions of the stock material formed by the perforating action of the radial projections.

As further shown in FIG. 6, the perforations 164 are formed in a row in the central portion of the dunnage product. Also, the row of perforations is formed between two rows of dents 180 in the strip formed by the teeth on the side discs of the stitching wheels.

Figure 8:
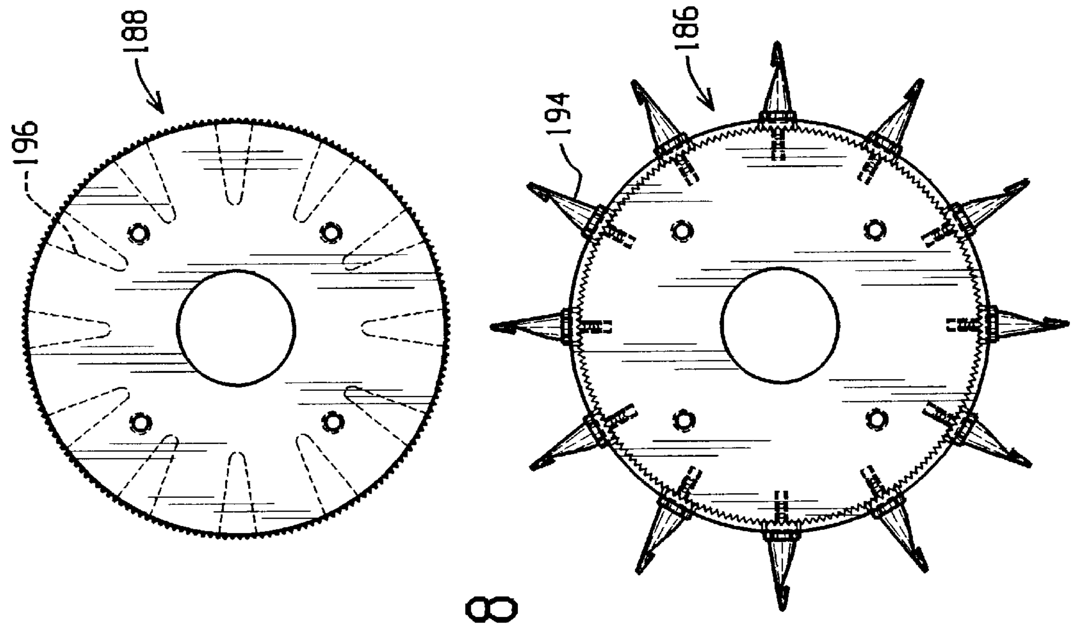
FIG. 8 is a side (axial end) view of the stitching wheels of FIG. 7.
Figure 7:
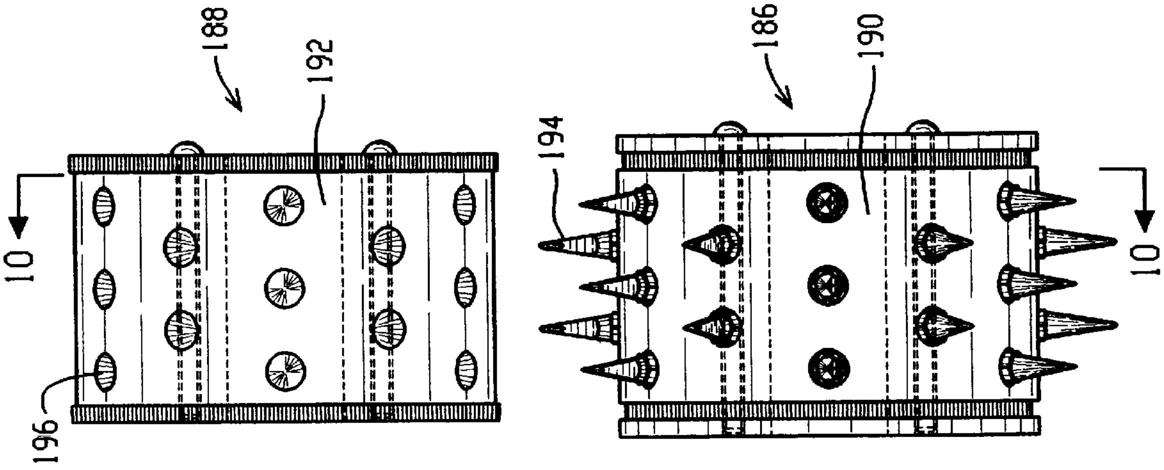
FIG. 7 is an elevational view of another embodiment of stitching wheels according to the invention.

Referring now to FIGS. 7 and 8, another embodiment of stitching wheels according to the invention is illustrated. In this embodiment, the male and female stitching wheels 186 and 188 are identical to the above described stitching wheels 70 and 72, respectively, except that their central discs 190 and 192 are axially wider to accommodate plural rows of radial projections 194 and corresponding recesses 196. As shown, the radial projections 194 are arranged in five annular rows with the radial projections in relatively adjacent rows being circumferentially staggered. Similarly, the recesses 196 are arranged in five rows with the recesses in relatively adjacent rows circumferentially staggered. It will of course be appreciated that the number of rows may be varied and the pattern of the radial projections and recesses may be otherwise varied as desired.

Figure 10:
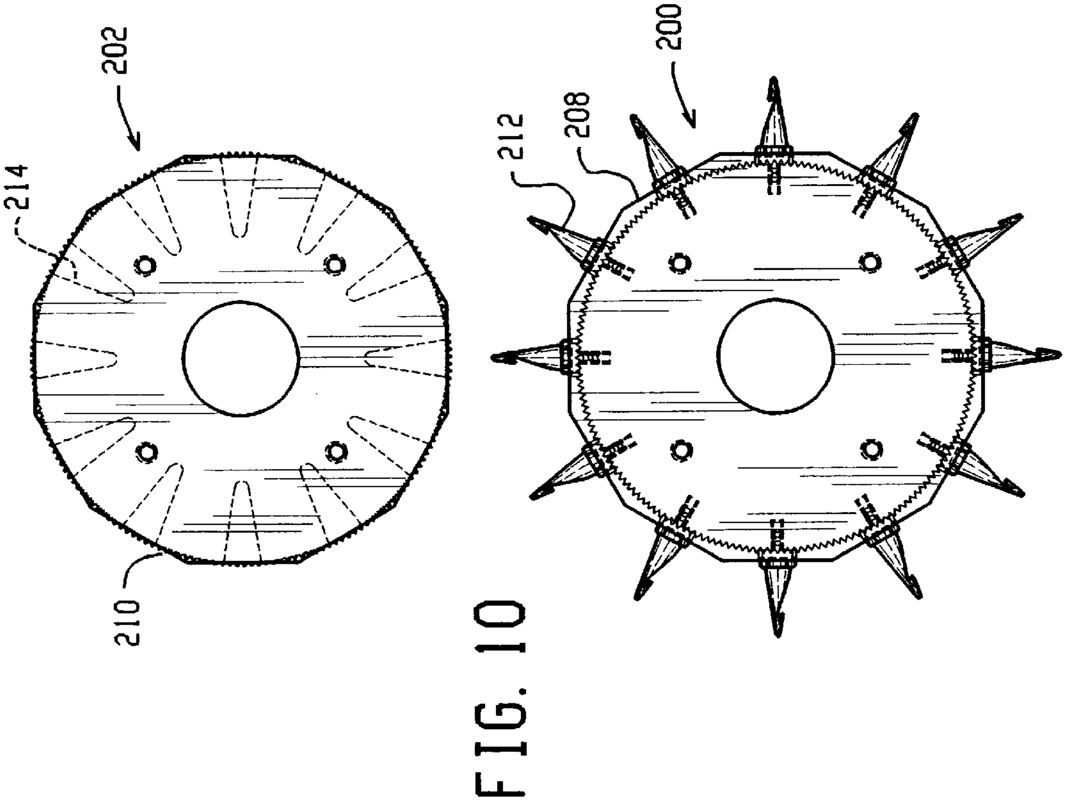
FIG. 10 is a side (axial end) view of the stitching wheels of FIG. 9.
Figure 9:
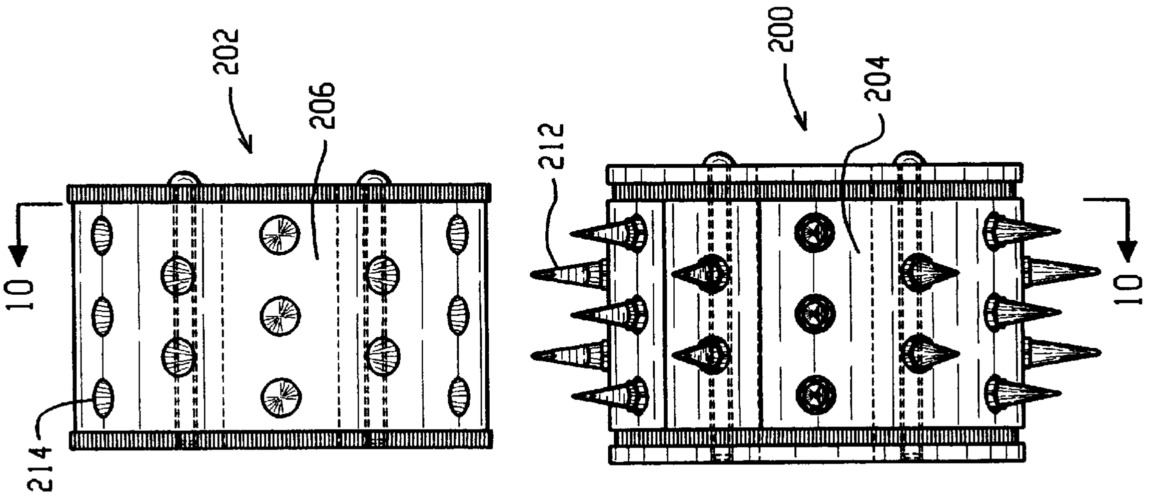
FIG. 9 is an elevational view of a further embodiment of stitching wheels according to the invention.

Referring now to FIGS. 9 and 10, a further embodiment of stitching wheels according to the invention is illustrated. In this embodiment, the male and female stitching wheels 200 and 202 are identical to the stitching wheels 186 and 188 of FIGS. 7 and 8, except that the central discs 204 and 206 of the stitching wheels have flats or facets 208 and 210 at the outer diameters thereof. The radial projections 212 extend radially from respective flats 208 while the recesses 214 of the female stitching wheel 202 open to respective flats 210. The flats 208 and 210 preferably extend between relatively adjacent flats, thereby forming therewith vertices and giving the central discs 204 and 206 a polygonal cross-sectional shape.

Figure 11:
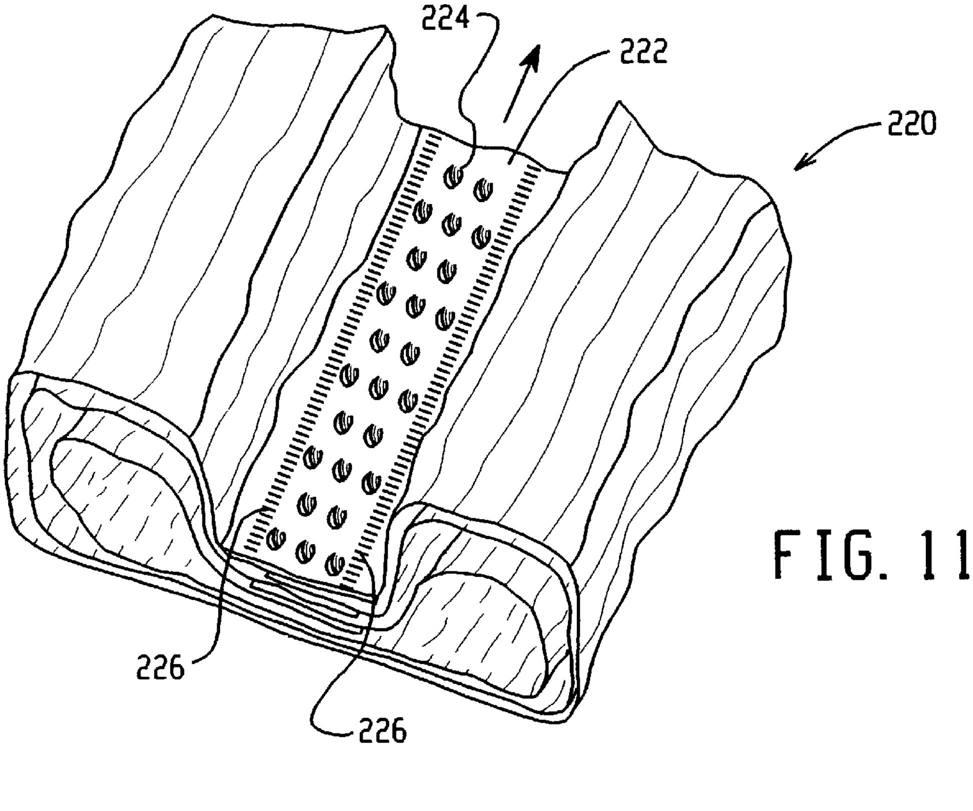
FIG. 11 is a fragmentary perspective view of a cushioning product made in accordance with the invention using the stitching wheels of FIGS. 7–8 or FIGS. 9–10.

The stitching wheels of FIGS. 7–8 or FIGS. 9–10 cooperate to produce a dunnage product like that illustrated at 220 in FIG. 11. The dunnage product is similar to that illustrated in FIG. 6, except that the central band portion 222 has formed therein plural rows of the perforations 224 in a pattern corresponding to the pattern of the radial projections and recesses of the stitching wheels. The plural rows of perforations are disposed between two parallel rows of dents formed by the teeth on the side discs of the stitching wheels.

Although the invention has been shown and described with respect to certain preferred embodiments, it is obvious that equivalent alterations and modifications will occur to others skilled in the art upon the reading and understanding of this specification. The present invention includes all such equivalent alterations and modifications.

What is claimed is:

1. A cushioning product formed from sheet stock material, the product comprising lateral pillow portions and a connecting portion therebetween;

the connecting portion including at least one longitudinal row of perforations;

each of the perforations including a tab portion hinged to a first edge section of the connecting portion surrounding the perforation;

wherein the tab portion is deformed in one direction and at least a portion of a second edge section is deformed in a generally opposite direction.

2. A cushioning product as set forth in claim 1 wherein the pillow portions comprise inwardly rolled and crumpled lateral regions of the sheet stock material; wherein the connecting portion comprises overlapped lateral edges of the sheet stock material; and wherein the perforations connect the overlapped lateral edges to maintain the geometry of the pillow portions.

3. A cushioning product as set forth in claim 2 wherein the connecting portion includes a central region of the sheet stock material.

4. A cushioning product as set forth in claim 3 wherein the connecting portion also includes at least one longitudinal row of dents adjacent the row of perforations.

5. A cushioning product as set forth in claim 4 wherein the central portion includes another longitudinal row of dents and wherein the row of perforations is situated between the two rows of dents.

6. A cushioning product as set forth in claim 5 wherein the stock material is biodegradable, recyclable and reusable.

7. A cushioning product as set forth in claim 5 wherein the stock material is paper.

8. A cushioning product as set forth in claim 5 wherein the stock material is Kraft paper.

9. A cushioning product as set forth in claim 8 wherein the stock material is thirty-pound Kraft paper.

10. A cushioning product as set forth in claim 5 wherein the stock material comprises three superimposed plies of thirty-pound Kraft paper.

11. A cushioning product as set forth in claim 1 wherein the connecting portion also includes at least one longitudinal row of dents adjacent the row of perforations.

12. A cushioning product as set forth in claim 6 wherein the connecting portion includes another longitudinal row of dents and wherein the row of perforations is situated between the two rows of dents.

13. A cushioning product as set forth in claim 12 wherein the connecting portion includes plural longitudinal rows of perforations.

14. A cushioning product as set forth in claim 1 wherein the connecting portion includes plural longitudinal rows of perforations.

15. A cushioning product as set forth in claim 14 wherein the perforations in adjacent longitudinal rows are staggered relative to each other.

16. A cushioning product as set forth in claim 1 wherein the stock material is biodegradable, recyclable and reusable.

17. A cushioning product as set forth in claim 1 wherein the stock material is paper.

18. A cushioning product as set forth in claim 17 wherein the stock material is Kraft paper.

19. A cushioning product as set forth in claim 18 wherein the stock material is thirty-pound Kraft paper.

20. A cushioning product as set forth in claim 1 wherein the stock material comprises three superimposed plies of thirty-pound Kraft paper.

* * * * *